(12) United States Patent
Nam

(10) Patent No.: US 10,210,994 B2
(45) Date of Patent: Feb. 19, 2019

(54) COIL STRUCTURE AND WIRELESS POWER TRANSMITTER USING THE SAME

(71) Applicant: Samsung Electro-Mechanics Co., Ltd., Suwon-Si (KR)

(72) Inventor: Isaac Nam, Suwon-Si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 96 days.

(21) Appl. No.: 14/757,508

(22) Filed: Dec. 23, 2015

(65) Prior Publication Data
US 2016/0189848 A1 Jun. 30, 2016

(30) Foreign Application Priority Data
Dec. 24, 2014 (KR) ........................ 10-2014-0189108

(51) Int. Cl.
| | | |
|---|---|---|
| H01F 27/00 | (2006.01) | |
| H01F 38/00 | (2006.01) | |
| H01F 38/14 | (2006.01) | |
| H01F 27/38 | (2006.01) | |
| H02J 50/12 | (2016.01) | |
| H02J 50/40 | (2016.01) | |
| H02J 7/02 | (2016.01) | |

(52) U.S. Cl.
CPC ............ *H01F 38/14* (2013.01); *H01F 27/38* (2013.01); *H02J 50/12* (2016.02); *H02J 50/40* (2016.02); *H02J 7/025* (2013.01)

(58) Field of Classification Search
CPC ........... H01F 38/14; H01F 27/38; H02J 50/12
USPC ........................................................ 307/104
See application file for complete search history.

(56) References Cited

U.S. PATENT DOCUMENTS

| | | | | |
|---|---|---|---|---|
| 7,068,223 | B2 * | 6/2006 | Yoshida ............. | G07C 9/00309 343/700 MS |
| 2008/0172109 | A1 * | 7/2008 | Rahman ............. | A61N 1/37229 607/60 |
| 2011/0031928 | A1 * | 2/2011 | Soar .......................... | F41G 1/34 320/108 |
| 2011/0084653 | A1 * | 4/2011 | Julstrom ................. | H01F 38/14 320/108 |
| 2012/0326773 | A1 | 12/2012 | Posat et al. | |
| 2013/0033408 | A1 | 2/2013 | Miki et al. | |
| 2013/0043836 | A1 | 2/2013 | Hui | |

(Continued)

FOREIGN PATENT DOCUMENTS

| | | |
|---|---|---|
| CN | 103155337 A | 6/2013 |
| CN | 103795151 A | 5/2014 |

(Continued)

OTHER PUBLICATIONS

German Office Action dated Aug. 29, 2016 in counterpart German Application No. 102015226282.0 (7 pages in English; 11 pages in German).

(Continued)

*Primary Examiner* — Rexford Barnie
*Assistant Examiner* — Toan Vu
(74) *Attorney, Agent, or Firm* — NSIP Law

(57) ABSTRACT

A coil structure may include a first coil wound on one plane, at least one second coil wound around the first coil, and at least one third coil wound around the first coil in a direction which is perpendicular to a winding direction of the at least one second coil.

22 Claims, 12 Drawing Sheets

(56) References Cited

U.S. PATENT DOCUMENTS

| | | | |
|---|---|---|---|
| 2013/0193773 A1 | 8/2013 | Van Wageningen | |
| 2014/0028112 A1* | 1/2014 | Hui | H01F 38/14 307/104 |
| 2014/0168026 A1* | 6/2014 | Nakamura | H01F 5/04 343/788 |
| 2014/0333151 A1* | 11/2014 | Matsui | H02J 5/005 307/104 |
| 2015/0054344 A1* | 2/2015 | Ng | H02J 17/00 307/104 |
| 2015/0061577 A1* | 3/2015 | Ye | H02J 7/025 320/108 |
| 2015/0137746 A1 | 5/2015 | Lee et al. | |

FOREIGN PATENT DOCUMENTS

| | | |
|---|---|---|
| DE | 20 2008 004 315 U1 | 9/2009 |
| DE | 10 2008 016 255 A1 | 10/2009 |
| DE | 10 2009 013 694 A1 | 9/2010 |
| DE | 10 2012 210 642 A1 | 12/2012 |
| JP | 7-253412 A | 10/1995 |
| KR | 10-2010-0136206 A | 12/2010 |
| WO | WO 2009/123847 A1 | 10/2009 |
| WO | WO 2011/129347 A1 | 10/2011 |
| WO | WO 2013/172630 A1 | 11/2013 |

OTHER PUBLICATIONS

Chinese Office Action dated May 3, 2018 in Chinese Patent Application No. 201510983064.2 (20 pages in English, 14 pages in Chinese).

Chinese Office Action dated Sep. 4, 2017 in corresponding Chinese Patent Application No. 201510983064.2 (20 pages in English and 13 pages in Chinese).

* cited by examiner

COIL STRUCTURE AND WIRELESS POWER TRANSMITTER USING THE SAME

CROSS-REFERENCE TO RELATED APPLICATION

This application claims the benefit of Korean Patent Application No. 10-2014-0189108 filed on Dec. 24, 2014 in the Korean Intellectual Property Office, the entire disclosure of which is incorporated herein by reference for all purposes.

BACKGROUND

1. Field

The following description relates to a coil structure and a wireless power transmitter using the same.

2. Description of Related Art

In accordance with the development of wireless technology, various wireless functions range from the transmission of data to transmission of power. Recently, non-contact type wireless charging technology capable of charging various portable devices has become an issue.

However, in wireless power transmitting technology according to the related art, there are numerous constraints and requirements to smoothly perform charging. That is, in transmitting and receiving power wirelessly, there are limits such as a limited transmission distance, a restrictive position relationship between a transmitter and a receiver, and the like. Therefore, there is a limit in that a wireless power charging may be substantially performed only if a wireless power receiver is positioned toward a specific position or a specific direction of a wireless power transmitter.

Meanwhile, wireless power technology has been applied to various portable devices. Therefore, a demand exists for wireless power charging technology capable of efficiently performing charging even in various environments and changing conditions.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

According to one general aspect, a coil structure includes a first coil wound on one plane. At least one second coil is wound around the first coil; and at least one third coil is wound around the first coil in a direction perpendicular to a winding direction of the at least one second coil.

The first coil may be wound in a quadrangular shape.

The at least one second coil may be wound around the first coil on the exterior of the first coil.

The at least one second coil may be wound around the first coil in a circular shape or an oval shape.

The at least one third coil may be wound around the first coil and the at least one second coil in the circular shape or the oval shape.

The at least one second coil may include a pair of second coils wound around the first coil in parallel with each other.

The at least one third coil may include a pair of third coils wound around the first coil to be perpendicular to the pair of second coils and to be disposed in parallel relation with each other.

The first coil may be configured to be magnetically coupled to an external wireless power receiving coil to wirelessly transmit power, and the at least one second coil may form a loop circuit. The at least one second coil may be configured to have the same resonance frequency as a resonance frequency of the first coil.

According to another general aspect, a wireless power transmitter wirelessly radiating power, includes: an inverter configured to provide resonance power; and a resonator configured to resonate according to the resonance power to wirelessly provide non-contact type power. The resonator includes a first coil wound on one plane; at least one second coil wound around the first coil; and at least one third coil wound around the first coil in a direction perpendicular to a winding direction of the at least one second coil.

The first coil may be configured to be magnetically coupled to an external wireless power receiving coil to wirelessly transmit power, and the at least one second coil and the at least one third coil may respectively form a loop circuit.

The at least one second coil and the at least one third coil may be configured to amplify an output signal of the first coil, and to have the same resonance frequency as a resonance frequency of the first coil.

According to another general aspect, a wireless power transmitter wirelessly transmitting power, the wireless power transmitter includes a first coil wound on one plane; at least one second coil wound around the first coil; at least one third coil wound around the first coil in a direction perpendicular to a winding direction of the at least one second coil; and, a processor configured to adaptively reconfigure at least one of an electrical connection or operational parameter of at least one of the coils.

The processor may be further configured to adaptively reconfigure, responsive to at least one of a sensed feedback from at least one of the coils or a user setting, or combinations thereof.

Other features and aspects will be apparent from the following detailed description, the drawings, and the claims.

BRIEF DESCRIPTION OF THE DRAWINGS

The above and other aspects, features and advantages of the present disclosure will be more clearly understood from the following detailed description taken in conjunction with the accompanying drawings, in which.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Hereinafter, various embodiments of a coil structure and a wireless power transmitter using the same according to the present disclosure will be described. The coil structure to be described below may be applied to a wireless power receiver in addition to the wireless power transmitter.

Figure 1:
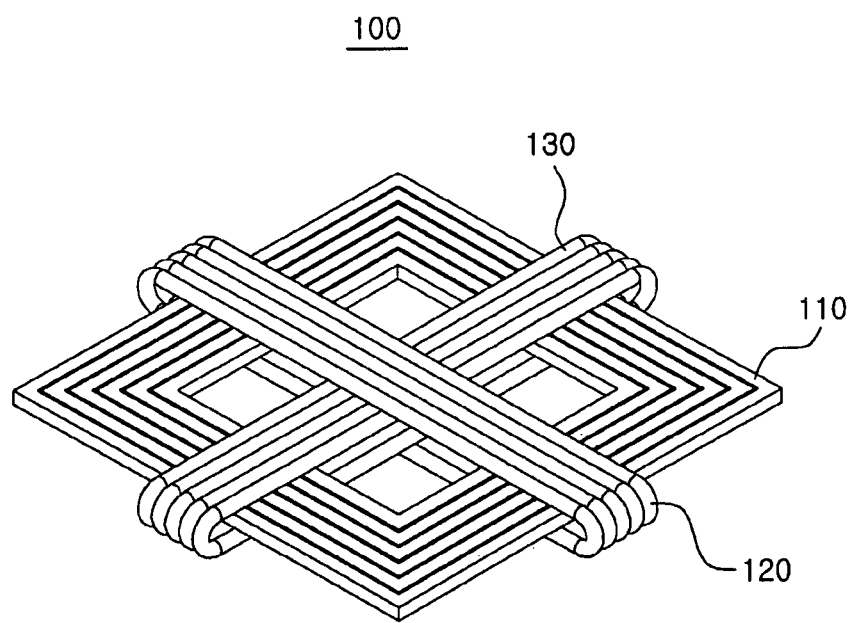
FIG. 1 is a perspective view illustrating an example of a coil structure according to an embodiment.
Figure 2:
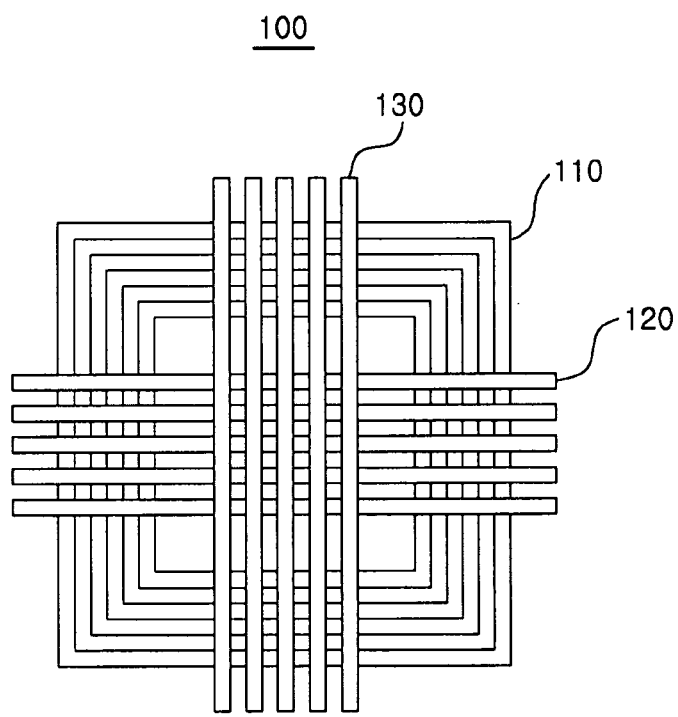
FIG. 2 is a plan view illustrating an example of the coil structure illustrated in FIG. 1.

FIG. 1 is a perspective view illustrating an example of a coil structure, and FIG. 2 is a plan view of the coil structure illustrated in FIG. 1.

Referring to FIGS. 1 and 2, a coil structure 100 includes a first coil 110, a second coil 120, and a third coil 130. The first coil 110 may be wound in a polygonal shape on one plane. For example, the first coil 110 may be wound in a quadrangular shape as illustrated.

The second coil 120 may be wound around the first coil 110. The third coil 130 may be wound around the first coil 110 in a direction perpendicular to a winding direction of the second coil 120. For instance, the second coil 120 and the third coil 130 may be wound around the first coil. Meanwhile, the second coil 120 and the third coil 130 may be wound to be perpendicular to each other.

According to an embodiment, the second coil 120 may be wound around the first coil 110 on the exterior of the first coil 110. The third coil 130 may be wound around the second coil 120 and the first coil 110, on the exterior of a coil structure in which the second coil 120 and the first coil 110 are wound. The second coil 120 may be wound around the first coil 110 in a circular shape, rectilinear, ellipsoid, or an oval shape. The third coil 130 may be wound around the first coil 110 and the second coil 120 in a circular shape, rectilinear, ellipsoid, or an oval shape.

Figure 3:
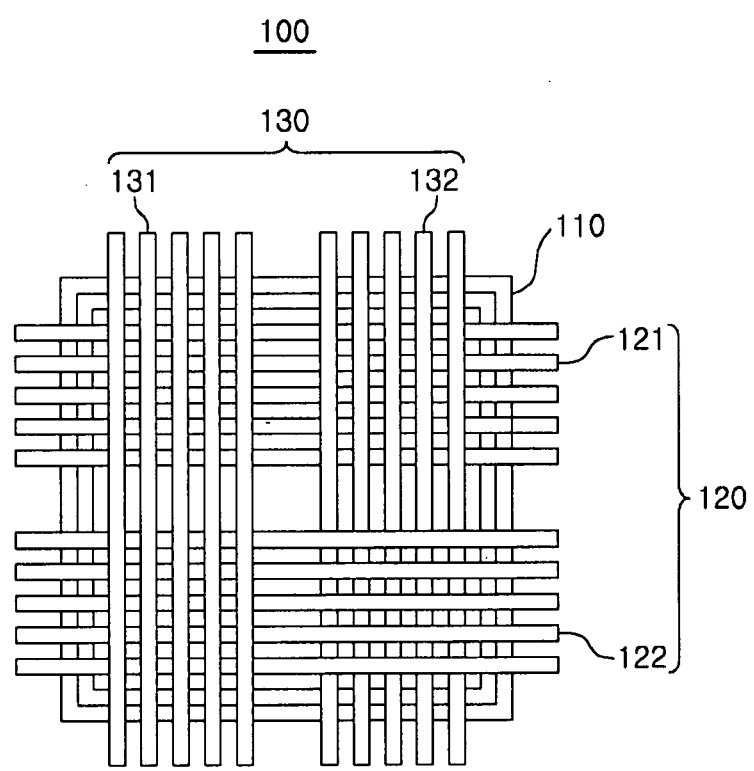
FIGS. 3 and 4 are plan views illustrating other examples of the coil structure illustrated in FIG. 1.
Figure 4:
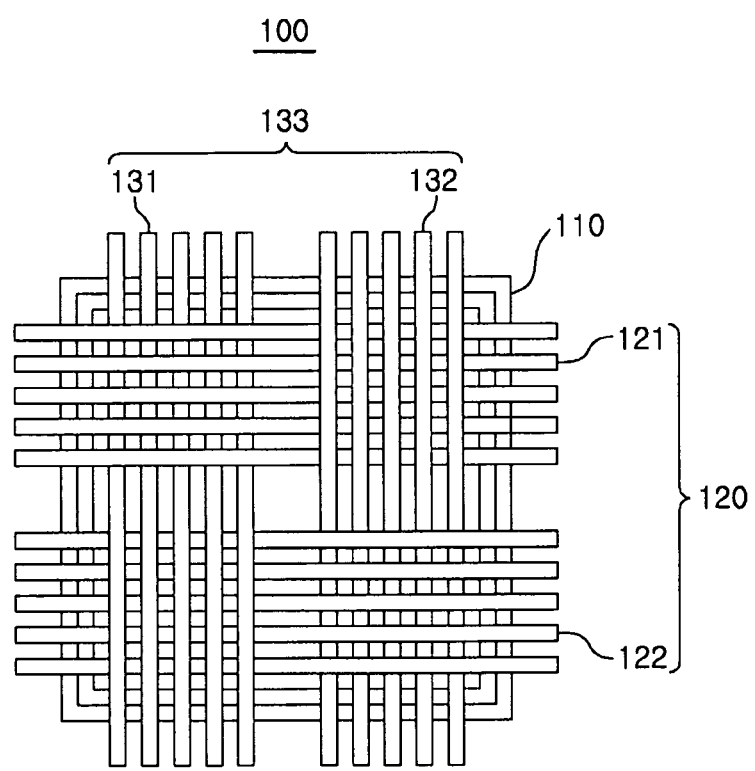

FIGS. 3 and 4 are plan views illustrating other examples of the coil structure illustrated in FIG. 1. Referring to FIGS. 3 and 4, the coil structure 100 may be formed by winding a plurality of second coils 120 and/or third coils 130 around the first coil 110. A plurality of second coils 120 may be wound around the first coil 110. Additionally, or in lieu, a plurality of third coils 130 may be wound around the first coil 110. The windings of the third coils 130 may also be such that the plurality of second coils 120 may be captured by the third coils 130 as well.

Although the examples illustrated in FIGS. 3 and 4 illustrate cases in which the second coils 120 and the third coils 130 are each wound in pairs, this is merely illustrative. For example, the second coils 120 and the third coils 130 may be formed to be separated into a plurality of windings such as three or more windings.

According to an embodiment, a pair of second coils 121 and 122 may be wound around the first coil 110 to be in parallel with each other. The pair of second coils 121 and 122 wound to be in parallel with each other may also be connected in series with each other or may also be connected in parallel with each other.

According to an embodiment, a pair of third coils 131 and 132 may be wound around the first coil 110 to be perpendicular to the pair of second coils 121 and 122 and be in parallel with each other.

FIG. 3 illustrates an example in which after the first coil 110 is wound, one coil 121 of the second coils, one coil 132 of the third coils, the other coil 122 of the second coils, and the other coil 131 of the third coils are sequentially wound. In this example, a winding process may be easily performed.

Meanwhile, FIG. 4 illustrates an example in which, after the first coil 110 is wound, the pair of second coils 121 and 122 and the pair of third coils 131 and 132 are wound in order in which the pair of second coils 121 and 122 and the pair of third coils 131 and 132 intersect with each other, and a portion of a finally wound coil is wound to pass through a portion below an initially wound coil. According to this example, a winding process may be somewhat complex, but may implement a stable binding state after the winding.

The embodiments illustrated in FIGS. 1 through 4 relate to embodiments in which the second coil 120 and the third coil 130 are wound around the first coil 110.

In the embodiments illustrated in FIGS. 1 through 4, the first coil 110, the second coil 120, and the third coil 130 may be used for different functions. For example, the first coil 110 may be used as a main coil used for power transmission or power reception, and the second coil 120 and the third coil 130 may be used as auxiliary coils assisting the first coil 110.

Figure 5:
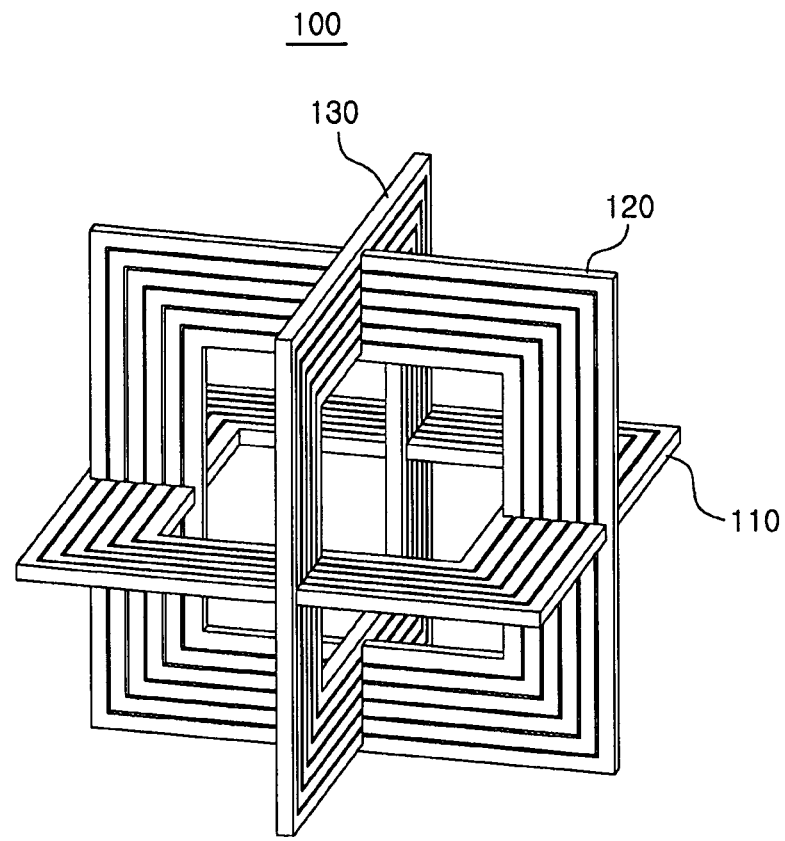
FIG. 5 is a perspective view illustrating another example of a coil structure according to an embodiment.

FIG. 5 is a plan view illustrating another example of a coil structure. FIG. 5 illustrates an example in which the second coil 120 and the third coil 130, as well as the first coil 110, are wound in a polygonal shape.

Thus, the first coil 110, the second coil 120, and the third coil 130 may be wound to be perpendicular to each other, defining an interior receiving space within the first coil 110 to the third coil 130 which may be empty, as illustrated, or may have a winding core (not illustrated) such as a polyhedral shape present therein.

According to the embodiment illustrated in FIG. 5, since the first coil 110 to the third coil 130 are perpendicular to each other, the first coil 110 to the third coil 130 may be used for the same function. For example, the first coil 110 to the third coil 130 may function as coils used for power transmission or power reception. In this case, the first coil 110 to the third coil 130 may perform power charging even at various angles or directions.

Figure 6:
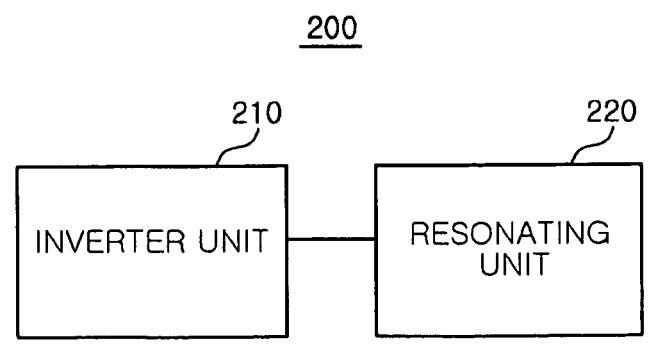
FIG. 6 is a view illustrating an example of a wireless power transmitter according to an embodiment.

FIG. 6 is a view illustrating an example of a wireless power transmitter.

Referring to FIG. 6, a wireless power transmitter 200 may include an inverter 210 and a resonator 220.

The inverter 210 may provide resonance power.

The resonator 220 may be resonated according to the resonance power to wirelessly provide non-contact type power.

The resonator 220 may include a resonance tank, and the resonance tank may include the coil structure described above with reference to FIGS. 1 through 5.

The resonator 220 may include a first coil, a second coil, and a third coil, and the first coil may be wound in a polygonal shape on one plane. The second coil may be wound around the first coil. The third coil may be wound around the first coil in a direction which is perpendicular to a winding direction of the second coil.

The first coil may be magnetically coupled to an external wireless power receiving coil to wirelessly transmit power.

Referring to FIGS. 1 through 4, the first coil 110 may serve as a main coil that wirelessly transmits power. Meanwhile, the second coil 120 and the third coil 130 may serve as auxiliary coils assisting the first coil.

FIGS. 7 through 16 are circuit diagrams illustrating various embodiments of the resonator illustrated in FIG. 6.

Hereinafter, various embodiments described above will be described in more detail with reference to FIGS. 7 through 16.

Figure 7:
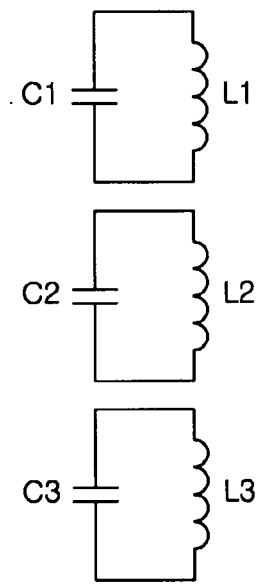
FIGS. 7 through 16 are circuit diagrams illustrating various embodiments of a resonating unit illustrated in FIG. 6.
Figure 8:
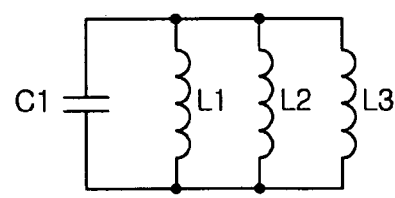
Figure 9:
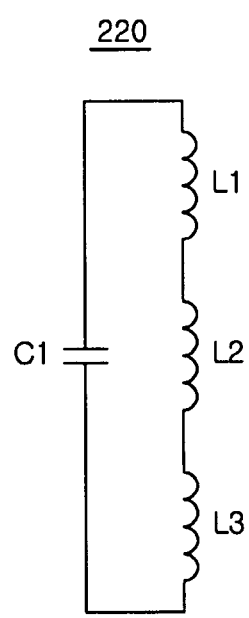

FIGS. 7 through 9 illustrate embodiments in which a first coil L1 to a third coil L3 are used for the substantially the same function, but in a respective plurality of different planes, as each other as described above with reference to FIG. 5.

FIG. 7 illustrates a configuration in which the first coil L1 to the third coil L3 are each independently configured. FIG. 8 illustrates a configuration in which the first coil L1 to the third coil L3 are connected in parallel with each other, and FIG. 9 illustrates a configuration in which the first coil L1 to the third coil L3 are connected in series.

Figure 10:
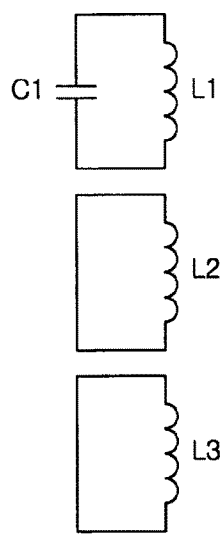
Figure 11:
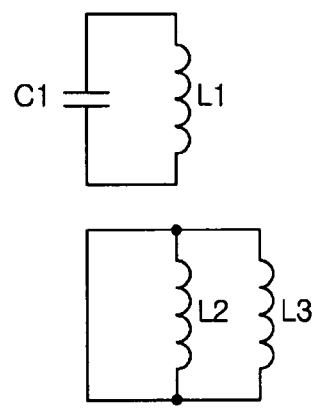
Figure 12:
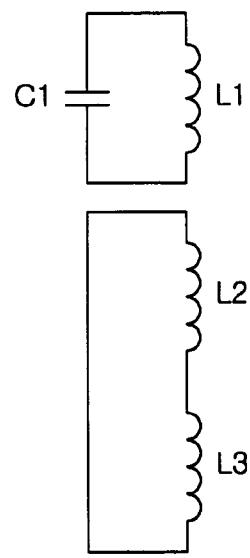

Meanwhile, FIGS. 10 through 12 illustrate embodiments in which the first coil L1, the second coil L2, and the third coil L3 are used for different functions as described above with reference to FIGS. 1 through 4. For example, the first coil L1 may serve as a main coil used for power transmission or power reception, and the second coil L2 and the third coil L3 may serve as auxiliary coils assisting the first coil L1.

FIG. 10 illustrates a configuration in which the first coil L1 to the third coil L3 are each independently configured, FIG. 11 illustrates a configuration in which the second coil L2 and the third coil L3, which are the auxiliary coils, are connected in parallel with each other, and FIG. 12 illustrates a configuration in which the second coil L2 and the third coil L3, which are the auxiliary coils, are connected in series with each other.

The second coil L2 and the third coil L3 may form a loop circuit. For instance, as illustrated in FIGS. 10 through 12, the second coil L2 and the third coil L3, which are the auxiliary coils, may form the loop circuit.

The second coil L2 and the third coil L3 may be configured to have the same resonance frequency as that of the first coil L1. For instance, in a case in which the second coil L2 and the third coil L3, which are the auxiliary coils, have the same resonance frequency as that of the first coil L1, which is the main coil, in a state in which the second coil L2 and the third coil L3 form the loop circuit, the second coil L2 and the third coil L3 may amplify an output signal of the first coil L1, which is the main coil.

Since the auxiliary coil forming the loop circuit has parasitic capacitance of the coil, the auxiliary coil may be magnetically resonated together with the main coil to amplify a magnetic coupling of the main coil in the case in which the auxiliary coil has the same resonance frequency as that of the main coil.

Since the resonance frequency of the auxiliary coil may be changed depending on a change in capacitance or inductance of the auxiliary coil, the auxiliary coil may add a predetermined capacitor (not illustrated) in the loop circuit in order to adaptively set substantially the same resonance frequency as that of the main coil. The predetermined capacitor may include a fixed capacitor or a variable capacitor actuated by a controller, processor, or logic portion which may receive feedback indicating a capacitance or resonance frequency.

FIGS. 13 through 16 illustrate configurations to which impedance matching is variously applied.

Figure 13:
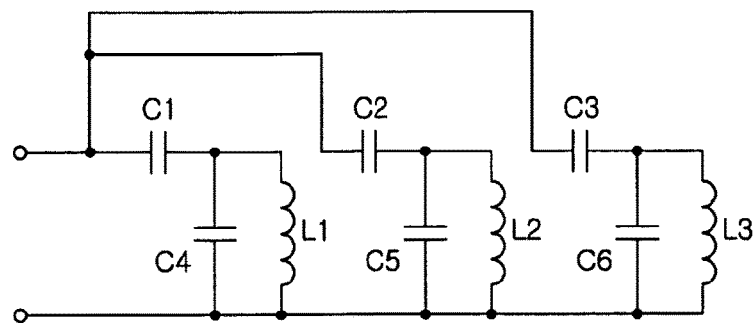
Figure 14:
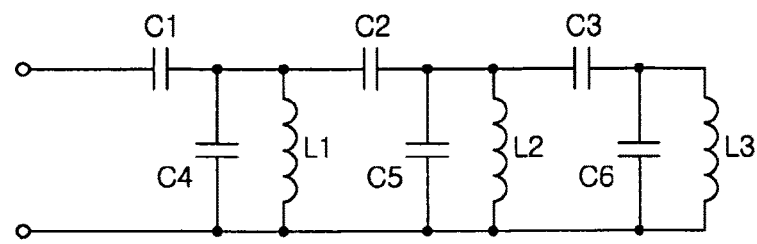

FIGS. 13 and 14 illustrate configurations of three coils which are impedance matched and are connected in parallel with each other.

Figure 15:
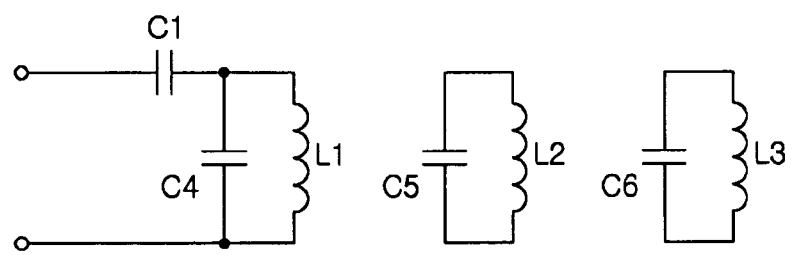

FIG. 15 illustrates a configuration in which one coil L1 is impedance matched and two coils L2 and L3 are operated as repeaters.

Figure 16:
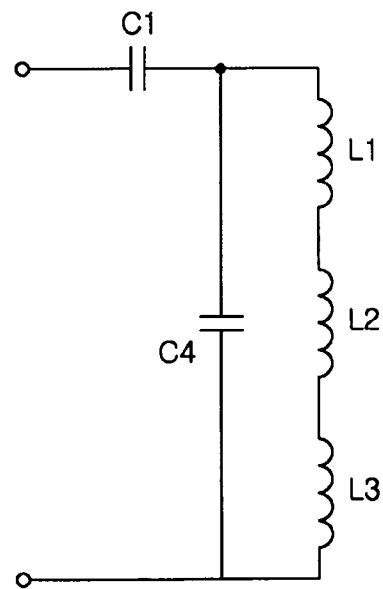

FIG. 16 illustrates a configuration of three coils which are impedance matched and are connected in series.

In the configurations shown in FIGS. 13 through 16, although capacitor elements C4, C5, and C6 which are connected in parallel to each of the coils are illustrated, the capacitor elements C4, C5, and C6 are not essential components. Thus, the capacitor elements C4, C5, and C6 which are connected in parallel to each of the coils may be partially omitted, reconfigured, substituted, or entirely omitted depending on the configuration.

Figure 17:
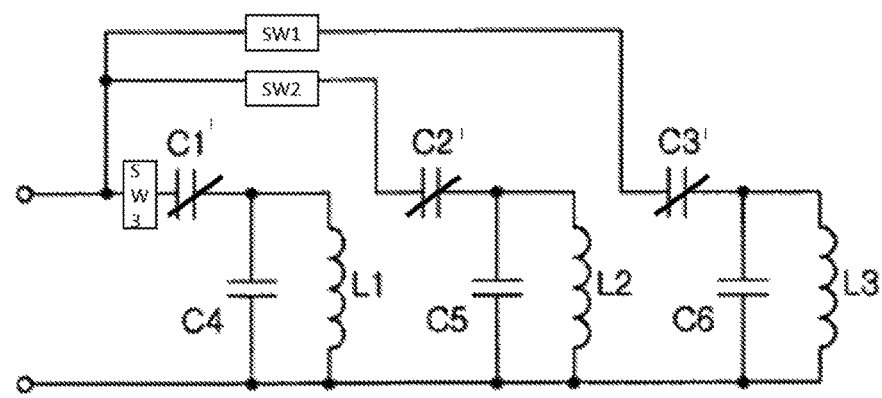
FIG. 17 illustrate a configuration of variable capacitor elements C1', C2' and C3' that are collectively grouped for actuation with switches SW1, SW2 and SW3.

In the illustrated example, since the capacitor elements are elements for adjusting capacitance, if the capacitor elements have an adequate capacitance value as a parasitic capacitor itself generated from each of the coils, a separate capacitor element may not be used. For instance, if capacitance of a target resonance frequency may be satisfied only by the parasitic capacitor of the coil, separate capacitor elements C1, C3, C3, etc., may be omitted. Alternatively, in FIG. 17, the capacitor elements C1, C2, and C3 may be collectively grouped for actuation with a number of switches (SW1, SW2 and SW3), or may include variable capacitor elements (C1', C2' and C3') for adaptive tuning responsive to feedback with a processor element. For example, operational parameters of the coils L1-L3 such as the impedance, capacitance, resonance frequencies, magnetic or inductive coupling, or reflected power may be measured by a processor through, for example, a feedback channel. The processor may evaluate the measured operational parameter and suitably adjust the configurations provided above, such as by adaptively increasing, decreasing, or maintaining one or more of an impedance, capacitance, number of coils or function of secondary coils to improve wireless power transfer. The processor may also provide for a limited user interface to allow a user, for example, to change operational modes manually. In this regard, a user may specify one or more of the type, distance, orientation of charging, the number of receiving devices, and the like. Responsive to one or more of feedback, data communication with a paired receiver, or the user input, the processor may actuate or modulate one or more of the variable capacitors, capacitor network, coupling/decoupling switches, and/or change the connection amongst loops 110-130 between parallel and serial connection as described above. For example, when a reflected wave exceeds a certain threshold, the capacitance may be suitably modulated through application of a variable capacitor or switching network. Additionally, one or more additional loops 120-130 or L2-L3 may be collectively employed in different configurations in response to a sensed feedback or manual user settings.

As set forth above, according to the embodiments, the efficiency of wireless power transmission may be increased even in various non-ideal environments.

The apparatuses, units, modules, devices, and other components (e.g., the capacitors C1-C6, inductor loops L1-L3 110-130, inverter 210, resonator 220, and variable capacitor controller) illustrated in FIGS. 1 through 16 that perform the operations described herein are implemented by hardware components. Examples of hardware components include controllers, sensors, generators, drivers, and any other electronic components known to one of ordinary skill in the art. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The adaptive impedance matching described herein may be performed by a logic circuit, a processor, or a computer as described above executing instructions or software to perform the operations described herein.

Instructions or software to control a processor or computer to implement the hardware components and perform the methods as described above are written as computer programs, code segments, firmware, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

As a non-exhaustive example only, a mobile terminal as described herein may include a mobile device, such as a cellular phone, a smart phone, a wearable smart device (such as a ring, a watch, a pair of glasses, a bracelet, an ankle bracelet, a belt, a necklace, an earring, a headband, a helmet, or a device embedded in clothing), a portable personal computer (PC) (such as a laptop, a notebook, a subnotebook, a netbook, or an ultra-mobile PC (UMPC), a tablet PC (tablet), a phablet, a personal digital assistant (PDA), a digital camera, a portable game console, an MP3 player, a portable/personal multimedia player (PMP), a handheld e-book, a global positioning system (GPS) navigation device, or a sensor, or a stationary device, such as a desktop PC, a high-definition television (HDTV), a DVD player, a Blu-ray player, a set-top box, or a home appliance, or any other mobile or stationary device capable of wireless or network communication. In one example, a wearable device is a device that is designed to be mountable directly on the body of the user, such as a pair of glasses or a bracelet. In another example, a wearable device is any device that is mounted on the body of the user using an attaching device, such as a smart phone or a tablet attached to the arm of a user using an armband, or hung around the neck of the user using a lanyard.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:
1. A coil structure comprising:
a first coil configured as a flat coil having plural coils wound radially in one plane;
a second coil wound around the first coil; and
a third coil wound around the first coil in a direction perpendicular to a winding direction of the second coil, wherein the second coil and the third coil from a loop circuit that is configured to have a same resonance frequency as a resonance frequency of the first coil.

2. The coil structure of claim 1, wherein the first coil is wound in a quadrangular shape.

3. The coil structure of claim 1, wherein the second coil is wound around the first coil on an exterior of the first coil.

4. The coil structure of claim 1, wherein the second coil is wound around the first coil in a circular shape or an oval shape.

5. The coil structure of claim 4, wherein the third coil is wound around the first coil and the second coil in the circular shape or the oval shape.

6. The coil structure of claim 1, wherein the second coil comprises a pair of second coils wound around the first coil, the pair of second coils being parallel with each other.

7. The coil structure of claim 6, wherein the third coil comprises a pair of third coils wound around the first coil to be perpendicular to the pair of second coils, the pair of third coils being disposed in parallel relation with each other.

8. The coil structure of claim 1, wherein the first coil is configured to be magnetically coupled to an external wireless power receiving coil to wirelessly transmit power.

9. A wireless power transmitter wirelessly radiating power, the wireless power transmitter comprising:
   an inverter configured to provide resonance power; and
   a resonator configured to resonate according to the resonance power to wirelessly provide non-contact type power, the resonator comprising:
      a first coil wound in one plane;
      a second coil wound around the first coil; and
      a third coil wound around the first coil in a direction perpendicular to a winding direction of the second coil,
   wherein the second coil and the third coil form a loop circuit that is configured to have a same resonance frequency as a resonance frequency of the first coil.

10. The wireless power transmitter of claim 9, wherein the second coil is wound around the first coil on the exterior of the first coil.

11. The wireless power transmitter of claim 9, wherein the second coil is wound around the first coil in a circular shape or an oval shape.

12. The wireless power transmitter of claim 11, wherein the third coil is wound around the first coil and the second coil in the circular shape or the oval shape.

13. The wireless power transmitter of claim 9, wherein the second coil comprises a pair of second coils wound around the first coil, the pair of second coils being parallel with each other.

14. The wireless power transmitter of claim 13, wherein the third coil comprises a pair of third coils wound around the first coil to be perpendicular to the pair of second coils, the pair of third coils being parallel with each other.

15. The wireless power transmitter of claim 9, wherein the first coil is configured to be magnetically coupled to an external wireless power receiving coil to wirelessly transmit power, and
   the second coil and the third coil respectively form a loop circuit.

16. The wireless power transmitter of claim 15, wherein the second coil and the third coil are configured to amplify an output signal of the first coil.

17. A wireless power transmitter wirelessly transmitting power, the wireless power transmitter comprising:
   a first coil having plural coils wound radially in one plane;
   a second coil wound around the first coil;
   a third coil wound around the first coil in a direction perpendicular to a winding direction of the second coil; and,
   a processor configured to adaptively reconfigure any one or both of an electrical connection or operational parameter of the first, second and third coils,
   wherein the second coil and the third coil from a loop circuit that is configured to have a same resonance frequency as a resonance frequency of the first coil.

18. The wireless power transmitter of claim 17, wherein the processor is further configured to adaptively reconfigure responsive to any one or both of a sensed feedback from at least one of the first, second and third coils or a user setting.

19. The wireless power transmitter of claim 9, further comprising a processor configured to adaptively reconfigure any one or both of an electrical connection or operational parameter of at least one of the first, second and third coils.

20. The coil structure of claim 1, further comprising a processor configured to adaptively reconfigure any one or both of an electrical connection or operational parameter of at least one of the first, second and third coils.

21. The wireless power transmitter of claim 9, wherein the first coil is configured as a flat coil having plural coils wound radially in one plane.

22. The coil structure of claim 1, wherein the first coil is a main coil configured to transmit power, and the second and third coils are auxiliary coils configured to amplify a magnetic coupling of the main coil.

* * * * *